(12) United States Patent
Treves et al.

(10) Patent No.: US 10,153,972 B2
(45) Date of Patent: *Dec. 11, 2018

(54) METHOD AND APPARATUS FOR CODING A USER DEFINED CONSTANT INTO A KEY COMPOSITION RULE USING VARIABLE LENGTH COMMAND

(71) Applicant: NXP USA, Inc., Austin, TX (US)

(72) Inventors: Ron Treves, Kfar Saba (IL); Evgeni Ginzburg, Petah Tikva (IL); Adi Katz, Ramat Gan (IL)

(73) Assignee: NXP USA, Inc., Austin, TX (US)

( * ) Notice: Subject to any disclaimer, the term of this patent is extended or adjusted under 35 U.S.C. 154(b) by 753 days.

This patent is subject to a terminal disclaimer.

(21) Appl. No.: 14/622,289

(22) Filed: Feb. 13, 2015

(65) Prior Publication Data

US 2016/0239525 A1 Aug. 18, 2016

(51) Int. Cl.
| | | |
|---|---|---|
| G06F 7/00 | (2006.01) | |
| G06F 17/00 | (2006.01) | |
| H04L 12/741 | (2013.01) | |
| H04L 12/64 | (2006.01) | |

(52) U.S. Cl.
CPC ........ *H04L 45/745* (2013.01); *H04L 12/6418* (2013.01)

(58) Field of Classification Search
CPC ......... G06F 17/30312; G06F 17/30575; G06F 17/30598
USPC ....................................................... 707/610
See application file for complete search history.

(56) References Cited

U.S. PATENT DOCUMENTS

| | | | |
|---|---|---|---|
| 5,748,905 A | 5/1998 | Hauser et al. | |
| 7,177,930 B1* | 2/2007 | LoPresti | H04L 41/142 709/223 |
| 7,760,719 B2 | 7/2010 | Yik et al. | |
| 8,009,673 B2 | 8/2011 | Gandal et al. | |
| 8,312,066 B2 | 11/2012 | Jagannathan et al. | |
| 2003/0123456 A1* | 7/2003 | Denz | H04L 45/04 370/400 |
| 2003/0189932 A1* | 10/2003 | Ishikawa | H04L 47/10 370/392 |
| 2004/0039832 A1* | 2/2004 | Hidaka | H04L 12/4666 709/230 |
| 2005/0141517 A1* | 6/2005 | Choi | H04L 45/00 370/395.31 |
| 2009/0097501 A1* | 4/2009 | Gandal | H04L 45/742 370/465 |
| 2010/0293416 A1 | 11/2010 | Xu et al. | |
| 2011/0134920 A1 | 6/2011 | Dyke | |

(Continued)

OTHER PUBLICATIONS

S. Gridish, Freescale, QorIQ DPAA Enablement Software, EUFNET-T1309, Nov. 2013.

*Primary Examiner* — Binh V Ho

(57) ABSTRACT

A method and apparatus are provided for classifying received network frames (206) by extracting frame header data (e.g., n-tuple) which is combined with a key insert value (e.g., embedded prefix value "$OP0_1, OP0_2, \ldots OP0_{OP1}$") to generate a lookup key (216), where the key insert value is generated by decoding a key composition rule (235) to extract a constant value (OP0) and a repeat value (OP1), and then replicating the constant value one or more times specified by the repeat value.

16 Claims, 5 Drawing Sheets

(56) References Cited

U.S. PATENT DOCUMENTS

| | | | |
|---|---|---|---|
| 2011/0188503 A1* | 8/2011 | Hewson | H04L 45/02 370/392 |
| 2011/0264822 A1* | 10/2011 | Ferguson | H04L 45/00 709/235 |
| 2012/0177066 A1* | 7/2012 | Spransy | H04N 21/23406 370/486 |
| 2013/0163426 A1* | 6/2013 | Beliveau | H04L 67/327 370/235 |
| 2013/0188627 A1* | 7/2013 | Cheong | H04W 4/08 370/338 |
| 2014/0153571 A1* | 6/2014 | Neugebauer | H04L 45/7457 370/392 |
| 2016/0094460 A1* | 3/2016 | Shelar | H04L 45/56 370/392 |

* cited by examiner

METHOD AND APPARATUS FOR CODING A USER DEFINED CONSTANT INTO A KEY COMPOSITION RULE USING VARIABLE LENGTH COMMAND

BACKGROUND OF THE INVENTION

Field of the Invention

The present invention is directed in general to data processing of network packet communications. In one aspect, the present invention relates to a method, apparatus, system, and computer program product for processing frames.

Description of the Related Art

Existing digital communication networks transport large amounts of information data (e.g., voice, facsimile, television, audio, and/or video data) using network frames to convey the information data in accordance with various communication protocols which typically define dedicated fields as part of each frame header which may be parsed to determine or classify the type of the frame (which communication protocol) and then processed in response to the frame classification. Frame classification conventionally employs multiple policy lookup tables for processing frames, where each lookup table is accessed with a lookup key. The lookup key is generated in accordance with a key composition rule which controls the combination of predetermined fields or tuples (and/or other data fields) to be extracted from a received frame or other data vector into the generated lookup key. The contents of the key composition rule is a set of one or more Field Extract Command(s) (FEC) which define the specifics of the desired field to be extracted into the generated lookup key.

A typical classification flow may require multiple lookup table operations, each requiring its own lookup key. For example, a first received frame may be parsed, and based on instructions from key composition rules, source and destination addresses may be extracted, combined, and applied as a first table lookup key to produce a lookup result. This result can then be used in some logical combination with more frame header fields or parsed information to produce another lookup key to be used in another lookup search at one or more lookup tables. Each lookup table has an associated table descriptor which contains information about the table such as its size or the maximum number of rules it may contain, the number of valid or active rules currently contained in it, its location, the type of search algorithm to be used with it, etc. The table descriptor is used by the search engine when it performs a lookup search.

As seen from the foregoing, there are processing costs and memory space expenses associated with using multiple keys to access multiple lookup tables which occupy significant memory space in the frame classification flow, and the existing solutions for classifying and processing frames using multiple lookup tables and classification keys are extremely difficult at a practical level.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

A key composition device, system, and methodology are described for using a variable length Field Extract Command (FEC) in a key composition rule to code a user defined constant into a table lookup key for accessing a shared lookup table. In selected embodiments, a variable length FEC in a key composition rule is implemented as a User Defined Constant Field Extract Command (UDC FEC) which defines a user defined constant as a first operand and a repeat value as a second operand, such that, upon decoding of the UDC FEC within a key composition rule, the user defined constant is inserted into a classification key to be replicated by the number of times specified by the repeat value. In other embodiments, a UDC FEC in a key composition rule also defines one or more masks with associated mask offset values from the beginning of the inserted user defined constant(s) to control application of the mask(s) to the user defined constant(s) inserted into the classification key.

In operation, a received frame is parsed to generate frame metadata to be provided with the frame for further processing. A key generation engine receives frames and associated frame metadata to generate classification keys based on defined key composition rules. In accordance with the present disclosure, a key composition rule is defined to generate a classification key by combining a user defined value with a first set of one or more fields from the received frame and or metadata, where the user defined value is generated from a user defined constant value that is replicated by a user defined repeat value constant for insertion into the classification key. The generated classification key is then used to perform a table lookup on a subset of a shared lookup table and return a frame classification result for the received frame.

In this way, different user defined constant values may be used to enable table lookups on different subsets of the shared lookup table using classification keys which differ in their embedded constant value(s). In addition, the insertion of user defined constant values as key padding values enables the generation of table lookup keys having uniform key lengths. Memory storage space for lookup tables and table descriptors is also reduced by sharing the same lookup table and table descriptor for different searches using classification keys generated from different user defined constant value for each key, thereby reducing the number of tables and table descriptor space being used by unifying several lookup tables into one and using lookup keys which differ by a User Defined Constant (UDC) to perform searches on limited sections of the unified table. In addition, enhancements for Application Programming Interfaces (APIs) are provided for performing Longest Prefix Match (LPM) algorithms by providing an easy method for defining the LPM key with a User Defined Constant for the maximum length of prefix match.

Figure 1:
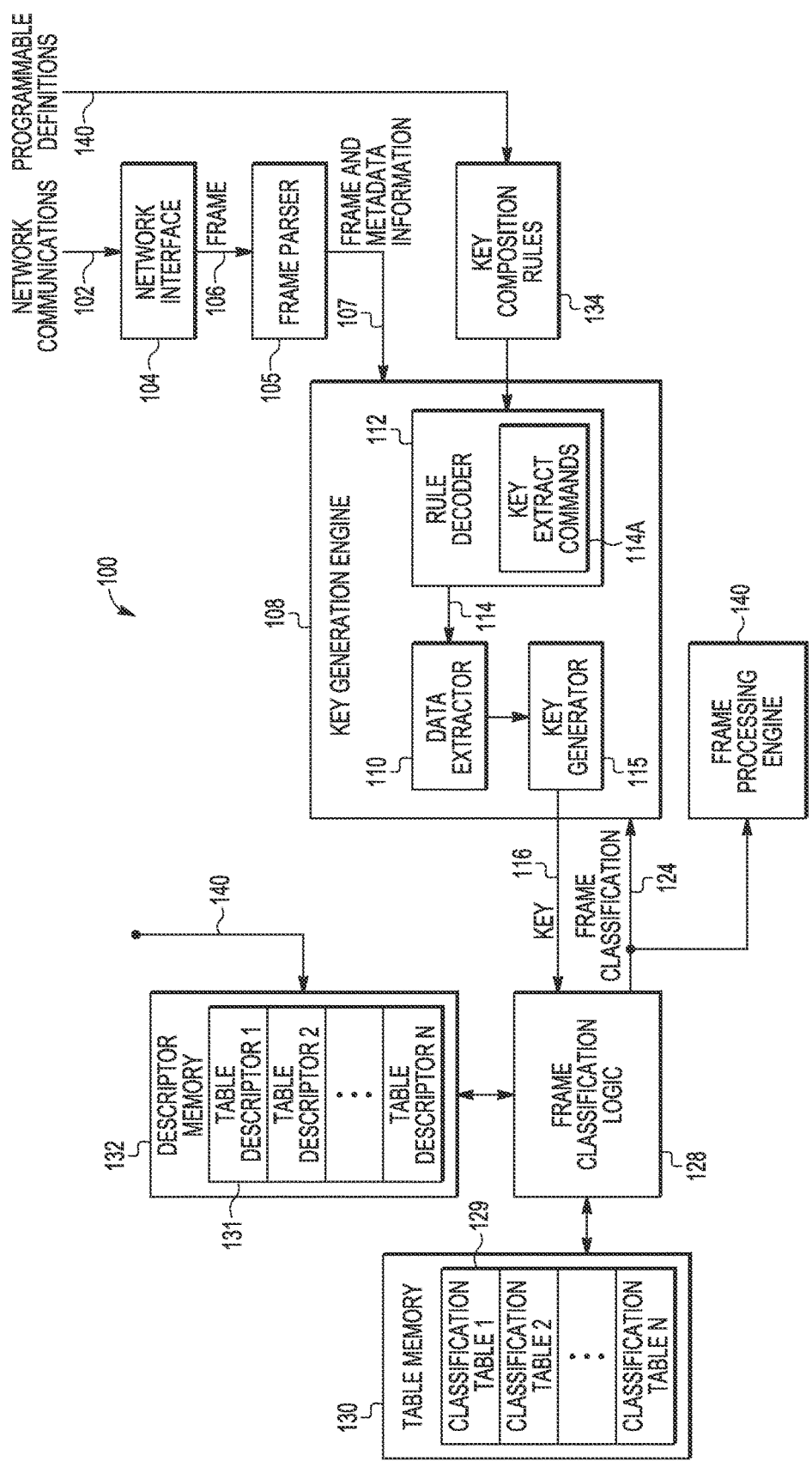
FIG. 1 illustrates a simplified schematic block diagram of a system for processing classification of network frames using a key composition rule to code a user-defined constant into a table lookup key in accordance selected embodiments of the present disclosure.

Turning now to FIG. 1, there is shown a simplified schematic block diagram of a system 100 for generating table lookup keys which may be embodied as a key generation and table lookup mechanism for processing frames and producing classification results in accordance selected embodiments of the present disclosure. A network interface 104 receives network communications 102, such as network packets or other network communications. Network interface 104 provides one or more network frames 106 associated with the network communications 102 to a frame parser 105. Frame parser 105 then parses the contents of each frame 106 and generates metadata associated with the frame 106. The metadata can include a variety of information related to the processed frames such as, for example, pointers to frame header fields, port numbers, traffic classes, and/or other information related to the frames and the frame contents. The frame data and the generated metadata can be stored within a data storage medium such as a frame buffer, if desired. After parsing the frames and generating the metadata associated with the frames, the frame parser 105 forwards the frame and metadata information 107 to key generation engine 108.

The key generation engine 108 generates a key 116 based upon data extracted from the frames and metadata information 107. The key generation engine 108 includes a rule decoder 112, data extractor 110, and key generator 115. The data extracted by data extractor 110 from the network frames and related metadata information 107 is based upon Field Extract Commands (FECs) 114 from the rule decoder 112. It is noted that the UDC FEC is a specific command which is one of the FECs 114. The rule decoder 112 generates the FECs 114 based upon key composition rules 134, and the key generator 115 generates the key 116 based upon the data extracted using these FECs 114. The key composition rules 134 can be defined by users through user programmable definitions 140.

The key 116 generated by the key generation engine 108 is provided to the frame classification logic 128. The frame classification logic 128 performs a table lookup search using the key 116 to search for data within frame classification tables 129 in the table memory 130, to identify and generate a frame classification 124 for each received frame 106. The frame classification 124 is then provided to the frame processing engine 140 along with the frame and metadata information 107. The frame classification 124 can include, for example, an indication that the frame is a data frame, an audio/video frame, a high priority frame, a low priority frame, and/or any other frame classification type. The frame processing engine 140 uses the frame result information 124, which includes the classified frame and metadata information, to determine how to process each of the received frames 106. In operation, the frame classification logic 128 can be configured to perform one or more table lookups to the frame classification tables 129 using the key 116 that is generated for the frame 106 by the key generation engine 108.

It is noted that the key generation engine 108, the frame classification logic 28, and/or the frame processing engine 140 can be implemented using one or more processing devices including controllers, microcontrollers, processors, microprocessors, hardware accelerators, configurable logic devices (e.g., field programmable gate arrays), and/or other processing devices. It is further noted that the composition rules 132/134 and/or the reference data/masks 136 can be stored in one or more data registers and/or other data storage mediums including any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. Other variations could also be implemented.

The processing of data frames can include, for example, receiving frames, parsing frames, generating lookup keys based on defined key composition rules, performing lookups in one or more lookup tables stored in memory, classifying the data frame based on the lookup table results, identifying the corresponding application data flow that the data frame is associated with, and the like. In support thereof and as described in greater detail hereinbelow, the key generation engine 108, frame parser 105, and frame classification logic 128 may be embodied as hardware accelerators configured to perform application-specific tasks with respect to data packets processed by the frame processing engine 140.

Figure 2:
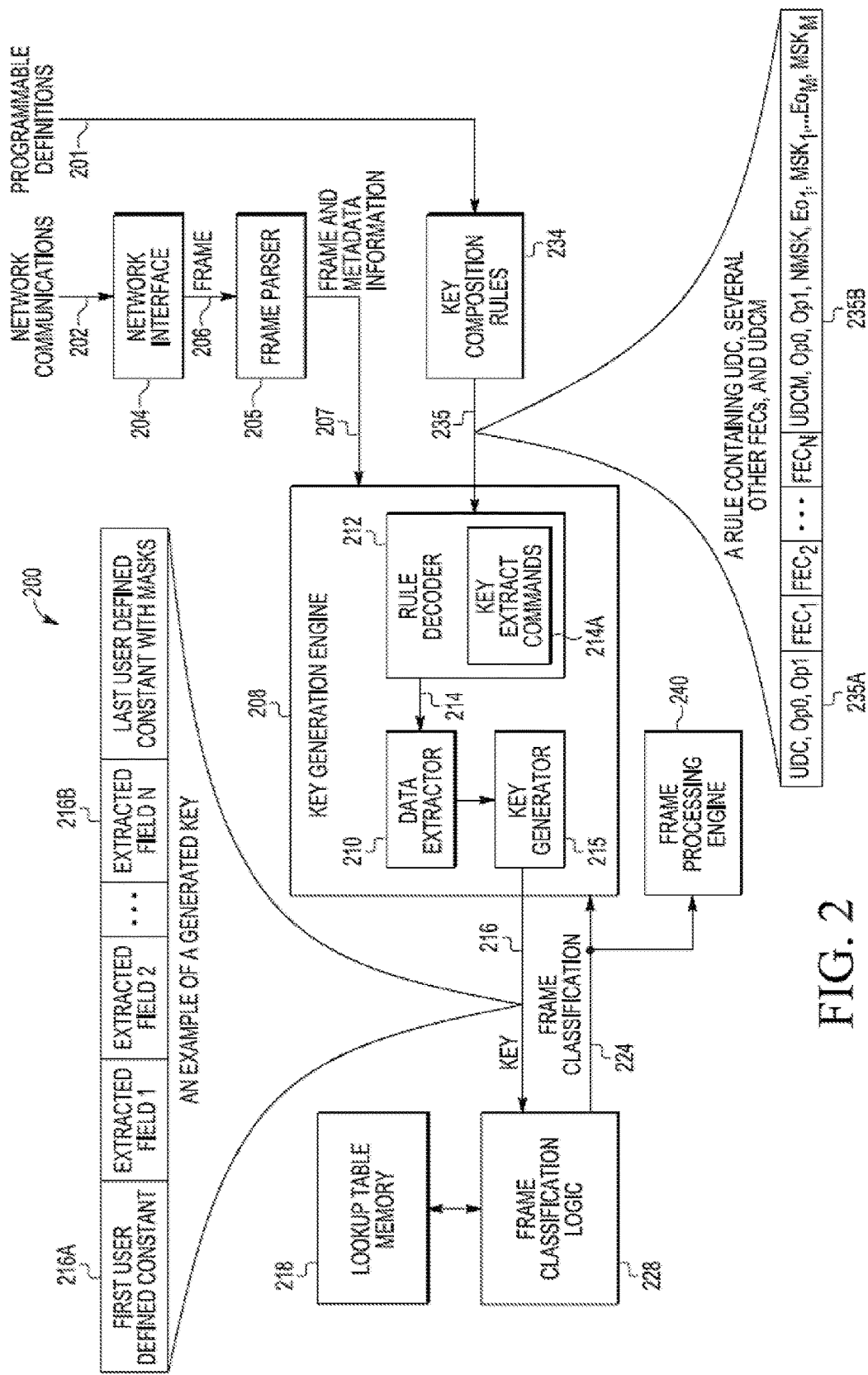
FIG. 2 illustrates the logical linkage between a key composition rule, the generated lookup key, and the table descriptor and lookup table for which the generated key is intended.

To provide additional context for selected example embodiments of the present disclosure, reference is now made to FIG. 2 which illustrates the logical linkage between one or more key composition rules 234, the generated lookup key 216, and the table descriptor and lookup table 218 for which the generated key 216 is intended by depicting a simplified structure of a key composition rule 235 containing a UDC FEC. In accordance with selected embodiments of the present disclosure, one of the FECs in a key composition rule 235 which is decoded by the rule decoder 212 serves as an instruction or key extract command 214A to cause the Data Extractor 210 included in the Key Generation Engine 208 to insert a user-defined constant (UDC) into a classification key. To this end, the UDC FEC 235A may include at least a first identifying UDC header portion, a second header portion or operand field which specifies a user-defined constant (e.g., OP0), and a third header portion or operand field which specifies a user-defined repeat value (e.g., OP1) specifying how many times the user-defined constant should be repeated or replicated in the generated classification key. In selected embodiments, the UDC FEC 235A is a variable length instruction or command which is implemented or decoded by the rule decoder 212 as a field extract command (FEC) to insert a user-defined constant specified as a first operand (e.g., OP0) and repeated as many times as specified in the value as a second operand (e.g., OP1) provided with the UDC FEC 235A in the rule 235, such that, upon decoding of the variable length UDC FEC 235A, the user-defined constant is inserted into a classification key to be replicated by the number of times specified by the repeat value, thereby inserting the user-defined constant 216A into the classification key. With a user-defined constant and repeat value, the variable length field extract command may be decoded at the rule decoder 212 to issue an extraction command 214 to the data extractor 210 for inserting the user-defined constant OP0 one or more (e.g., up to 16) times into a key. In FIG. 1, the resulting key 116 may include an n-tuple extracted from the frame headers along with a user-defined prefix constant with the user-defined constant OP0 repeated OP1 times.

As will be appreciated, there are a number of variations and modifications available for inserting a user-defined constant into a key at any predetermined location or locations. For example, a user-defined constant can be inserted as key padding at the end of a key to create a uniform length key. In addition or in the alternative, a user-defined constant may be inserted into the key in place of a field header or value that was missing from the received frame. In yet another embodiment, as shown in FIG. 2, the UDC FEC 235B may include a mask attribute designating whether a mask is applied on the inserted UDC data. In selected embodiments, when this attribute is set, the command shall be marked by adding the letter "M" (UDCM FEC) to designate that the UDC FEC is applied with accompanying masks. For example, reference is now made to FIG. 2 which illustrates a data structure 235B of a User Defined Constant FEC 235B in a key composition rule 235. As disclosed, the command includes at least a first identifying header portion UDCM which contains an attribute designating that one or more masks shall be used with the UDC, a second header/operand portion OP0 which specifies a user-defined constant, a third header/operand portion OP1 which specifies a user-defined repeat value, a third header/operand portion NMSK which specifies how many masks (e.g., M) shall be used in composing the overall mask, and M additional pairs of header/operand portions which respectively specify the actual mask and offset of each mask (e.g., $Eo_0$ and $MSK_0$, $Eo_1$ and $MSK_1$, $Eo_2$ and $MSK_2$, ... $Eo_M$ and $MSK_M$) from the beginning of the user-defined constant to be inserted. In an example embodiment, each mask is applied using a 1 byte mask data operand (e.g. $MSK_N$) and an offset operand (e.g., $Eo_N$) designating the location with respect to the start of the extracted data, at which the mask shall be applied.

With respect to a classification processing, classification keys 216 are generated by the key generation engine 208 and provided to the frame classification logic 228. The frame classification logic 228 performs table lookup search to generate a frame classification result 224 for each received frame 206. With this arrangement, the frame classification logic 228 may perform a search on the lookup table 218 by supplying the lookup key 216 as an input search term to determine whether a match exists. By inserting the user-defined constant as a prefix portion of the lookup key 216, the lookup search is effectively confined to the subset of table entries corresponding to the inserted UDC. In the event the search yields a match, the corresponding output field associated with the matching input search address is retrieved from the lookup table 218 for further processing. In selected embodiments, the lookup search result is a classification result which can be used for updating data fields and then generating a new lookup key, and or which may be concatenated with other key values and/or employed as the basis for a further search of the search field of another lookup table search.

It is noted that the frame parser 205, key generation engine 208 or frame processing engine 240 can be implemented as hardware accelerators, firmware, and/or software using one or more processors including controllers, microcontrollers, microprocessors, configurable logic devices (e.g., field programmable gate arrays), and/or other processing devices. It is further noted that the network frames, key composition rules, generated lookup keys and/or the lookup tables can be stored in one or more data registers and/or other data storage mediums including any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. Other variations could also be implemented.

Figure 3:
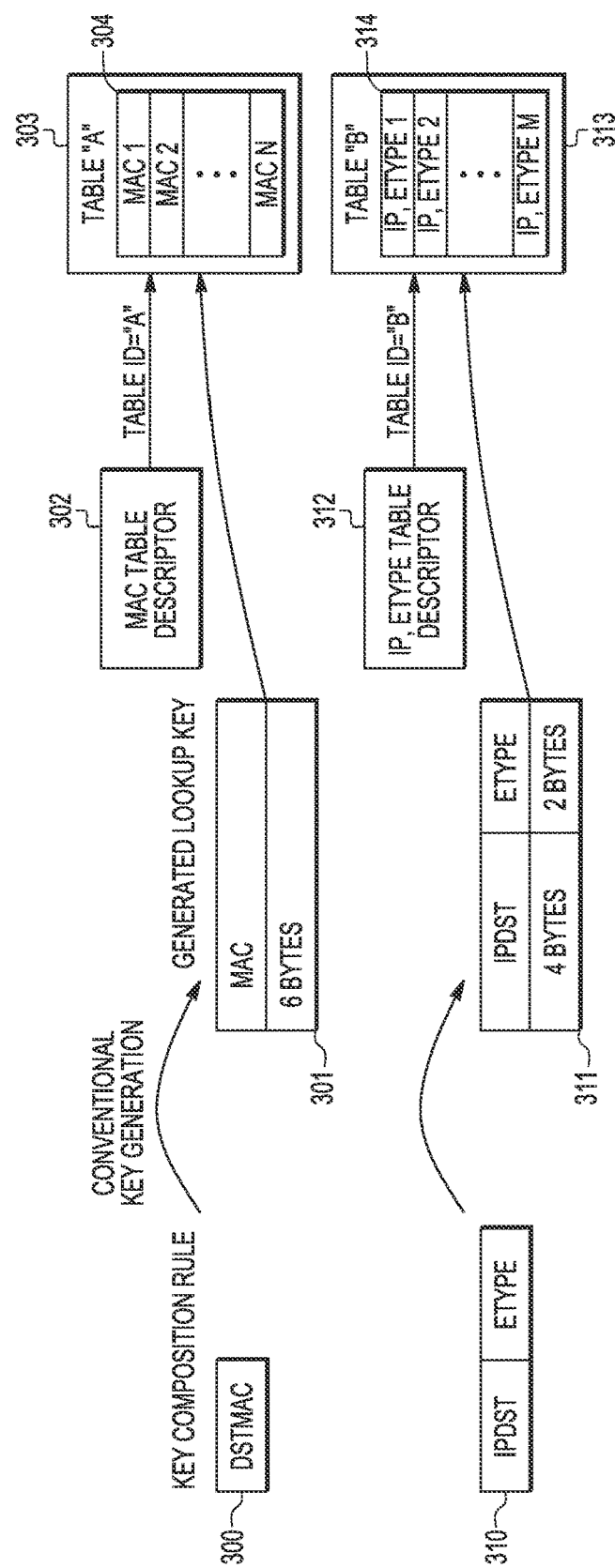
FIG. 3 illustrates the logical linkage between two key composition rules which are used to generate respective lookup keys of equal length for accessing separate lookup tables which each include a separate table descriptor.

To provide additional contextual understanding for the present disclosure, reference is now made to FIG. 3 which illustrates the logical linkage between two key composition rules which are used to generate lookup keys without user defined constants that are used to access separate lookup tables. As illustrated, a first key composition rule 300 contains a FEC for extracting the frame's destination MAC address (DSTMAC), thereby generating a 6 byte MAC lookup key 301 which is used to perform a lookup search in Table A 303, following the retrieval of information from table descriptor 302 which points to Table A 303 as the target table for lookup key 301. The result of the search yields retrieving a matching entry 304. In similar fashion, a second key composition rule 310 contains a FEC for extracting the frame's destination IP address (IPDST) and a FEC for extracting the frame's Ethernet type (ETYPE), thereby generating a 6 byte IPDST, ETYPE lookup key 311 which is used to perform a lookup search in a separate Table B 313, following the retrieval of information from table descriptor 312 which points to Table B 313 for retrieving a matching entry 314. With this conventional generation and usage of lookup keys 301, 311, the requirement of separate lookup tables 303, 313 and associated table descriptors 302, 312 consumes memory space.

Figure 4:
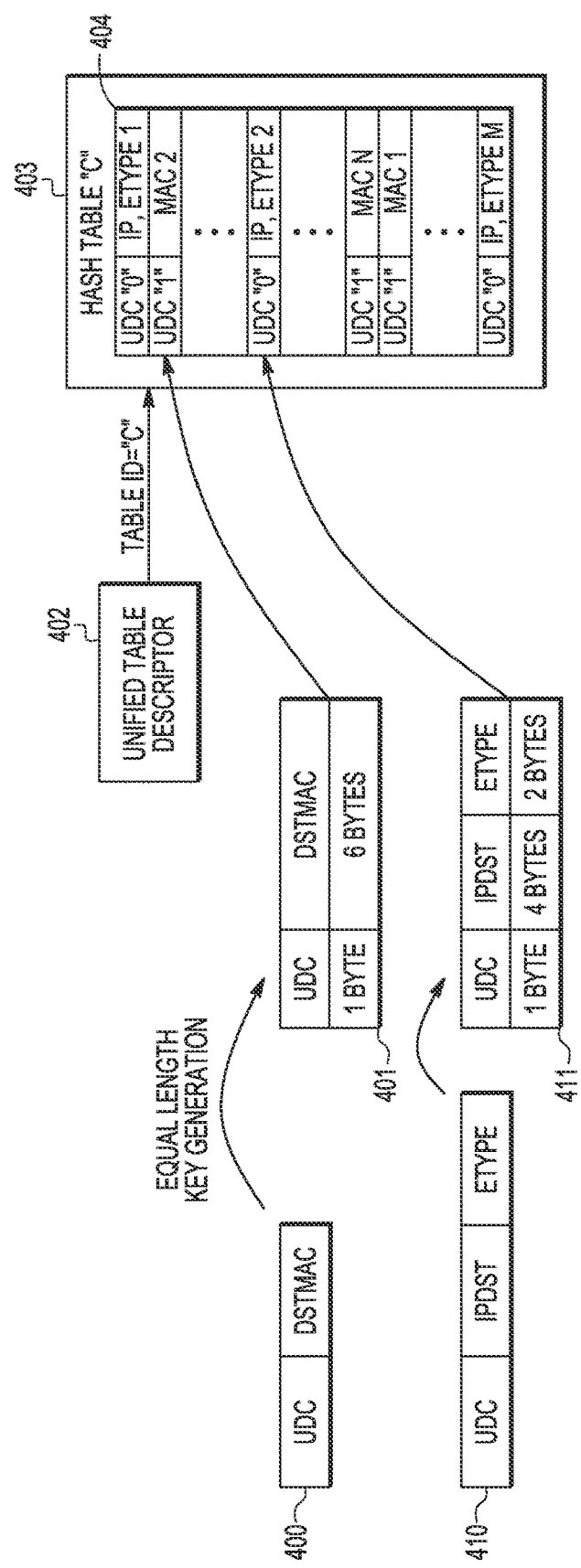
FIG. 4 illustrates the usage of two different UDC FEC in two different key composition rules for inserting user-defined constants unique to each rule into respectively generated keys in accordance with selected embodiments of the present disclosure.

To provide additional details for an improved understanding of selected embodiments of the present disclosure, reference is now made to FIG. 4 which illustrates the usage of two different UDC FEC in two different key composition rules for inserting user-defined constants unique to each rule into respectively generated keys of equal length in accordance with selected embodiments of the present disclosure. The separately generated lookup keys are pointed by the same table descriptor to a shared table, but are targeting different groups of table entries to be searched, based on differentiating prefixes matching the respective user-defined constants of each lookup key. This example demonstrates the ability to selectively search different groups of entries in a shared lookup table (only one table descriptor exists) and thus save memory space. As illustrated, a first key composition rule 400 contains a UDC FEC for inserting a user-defined constant, followed by a FEC for extracting the frame's destination MAC address (DSTMAC). When processed by key generation logic, the first key composition rule 400 generates a 7 byte lookup key 401 which includes a 1 byte UDC prefix key portion and a 6 byte MAC lookup key portion. After retrieving the information pointing to table descriptor 402, the lookup key 401 may be applied to perform a search in Hash Table C 403 for retrieving one of the matching entries 404, where the 1 byte UDC prefix key portion effectively limits the table lookup search to a subset of the table entries which match the embedded prefix value (e.g., UDC "1"). However, the same Hash Table C 403 may be used to provide other classification results by using lookup keys having a different embedded prefix value. For example, FIG. 4 shows that a second key composition rule 410, which contains a UDC FEC for inserting a user-defined constant, followed by a FEC for extracting the frame's destination IP address (IPDST) and Ethernet type (ETYPE), may be processed by key generation logic to generate a 7 byte lookup key 411 which includes a 1 byte UDC prefix key portion and a 6 byte IPDST, ETYPE lookup key portion.

After retrieving the information pointing to table descriptor 402, the lookup key 411 may be applied to perform a search in Hash Table C 403 for retrieving one of the matching entries 404. In this instance, the 1 byte UDC prefix key portion effectively limits the table lookup search to a subset of the table entries which match the embedded prefix value (e.g., UDC "0").

As seen from the example of FIG. 4, the insertion of a user-defined constant (UDC) as an embedded prefix value (e.g., "$OP0_1, OP0_2, \ldots OP0_{OP1}$") into the table lookup key enables a table lookup search on a subset of the table since the embedded prefix value confines the search to only the associated lookup table entries. In addition, the same lookup table can be used to search through a different subset of the table by inserting a different embedded prefix value in the table lookup key. As a result, lookup table descriptor memory is saved by sharing the same table for different searches based on different embedded prefix values per key. By providing the UDC key formation rule with the variable length field extract command in terms of the user defined constant and repeat value, an enhanced key formation rule functionality is provided for efficiently inserting one or more constant values into a lookup key. The disclosed UDC key formation rule also improves the code density and reduces the number of required registers and/or pre-configured values if using registers per rule that would otherwise be required to add the disclosed capability of having any constant values in a key.

Figure 5:
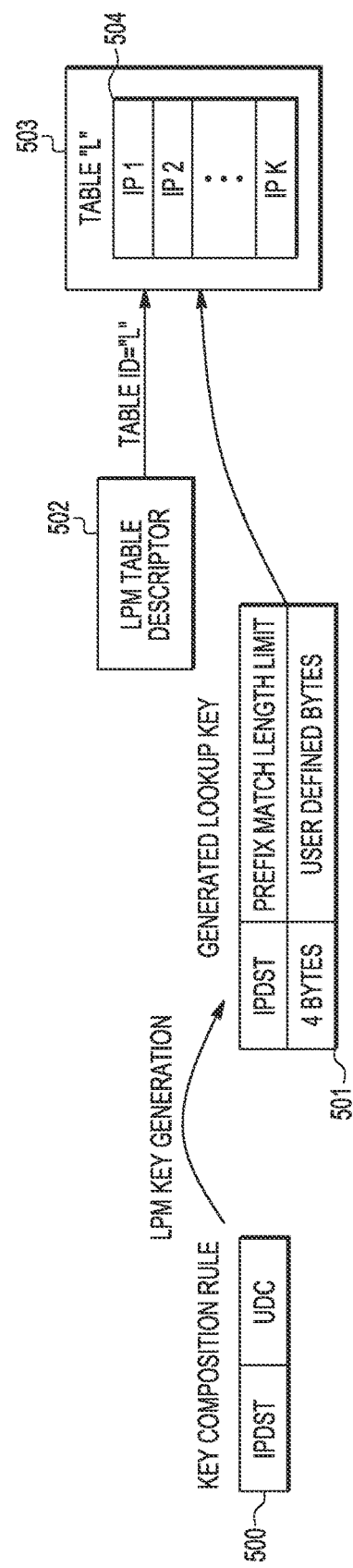
FIG. 5 illustrates the logical linkage between an LPM key composition rule, the generated lookup key, and the LPM table descriptor and LPM lookup table for which the generated key is intended.

To provide additional details for an improved understanding of selected embodiments of the present disclosure, reference is now made to FIG. 5 which illustrates the logical linkage between a Longest Prefix Match (LPM) key composition rule 500, the generated lookup key 501, and the LPM table descriptor 502 and LPM lookup table 503 for which the generated key is intended. In this example, an efficient way to deliver with the key a UDC added as a suffix, the value which defines the longest prefix match length for this algorithm. This value would otherwise be required to be delivered by some other method via for example an API or some hardware port. As illustrated, the LPM key composition rule 500 contains a UDC EEC and a FEC, for extracting the frame's destination IP address (IPDST). When processed by LPM key generation logic, the LPM key composition rule 500 generates an LPM lookup key 501 which includes a first, 4 byte IP destination key portion (IPDST) and a second key portion having a user-defined number of bytes for the maximum length of prefix match. When combined with a LPM table descriptor 502, the LPM lookup key 501 may be applied to key into Table L 503 for retrieving one of the matching entries 504.

By now it should be appreciated that there is provided herein a hardware-based method and apparatus for classifying received network frames, using lookup keys which contain frame header fields and using user-defined constants embedded into lookup keys. In the disclosed methodology, a frame is received and stored for processing. In an example embodiment, a first key composition rule is retrieved from memory and stored or loaded into a rule buffer, where the first key composition rule may include a user-defined constant (UDC) field extract command which includes a first operand defining a first constant value and a second operand defining a first repeat value, and may also include a mask attribute which may be set to indicate application of one or more mask operands, and one or more additional mask operand values defining a mask and one or more mask offset values from a beginning position in the key insert value for applying the mask. A key generator accelerator hardware device uses first and second operands to generate a key insert value by replicating the first constant value one or more times specified by the first repeat value. For example, the key insert value may be generated by decoding a UDC field extract command in the first key composition rule to extract a user-defined constant value and a user-defined repeat value, and then replicating the user-defined constant value one or more times specified by the user-defined repeat value to generate the key insert value. In other embodiments, the key insert value may be generated by decoding a UDC field extract command in the first key composition rule to extract a user-defined constant value, a user-defined repeat value, and the one or more additional mask operand values; replicating the user-defined constant value one or more times specified by the user-defined repeat value to generate a first sequence string; and then applying the mask to the first sequence string at any position specified by the one or more mask offset values, thereby generating the key insert value. Thereafter, the key generator accelerator hardware device generates a lookup key by combining the key insert value and an n-tuple extracted from the frame. For example, the lookup key may be generated by inserting the key insert value as a prefix in front of the lookup key (e.g., in front of an n-tuple), as a suffix of the lookup key (e.g., after the n-tuple), within the lookup key in place of one or more n-tuple fields, or on some other predetermined combination arrangement. In selected embodiments, the key insert value is generated by inserting data based on UDC field extract commands decoded from the first key composition rule using pipelined hardware logic. In other embodiments, the first key composition rule comprises a user-defined constant field extract command and one or more additional field extract commands, where the user-defined constant field extract command is decoded to generate the key insert value and where the one or more additional field extract commands are decoded to generate the n-tuple for combination with the key insert value to generate the lookup key. A frame classification accelerator hardware device then looks up frame processing instructions from a shared lookup table using the lookup key which was built from a combination of UDC field extract commands and/or any combination of other field extract commands. Using the lookup key, a first subset of entries in the shared lookup table may be accessed which match the key insert value.

In another form, there is provided a system for processing network frames which includes a network interface, key generation engine and frame processing engine. The network interface may be configured to receive network communications and to output frames associated with the network communications. The system may also include a frame parser for extracting the n-tuple from source and destination IP addresses, source and destination transport layer ports, and a transport protocol from predetermined header fields in the first frame. The key generation engine may be configured to receive a first frame from the network interface and to generate a first lookup key based on a first key composition rule which include a variable length field extract command, a first operand defining a first constant value, and a second operand defining a first repeat value. At the key generation engine, the first key composition rule is decoded to (1) generate a insert value from the first and second operands by replicating the first constant value one or more times specified by the first repeat value, and (2) combine the key insert value with an n-tuple extracted from the first frame to generate the first lookup key. For example, the key generation engine may generate the first lookup key by inserting the key insert value as a prefix in front of the first lookup key, as a suffix of the first lookup key, or by inserting the key insert value within the lookup key in place of one or more fields. In selected embodiments, the key generation engine includes a rule decoder and key generator. The rule decoder is configured for decoding a user defined constant field extract command in the first key composition rule to extract the first constant value and the first repeat value, while the key generator is configured for replicating the first constant value one or more times specified by the first repeat value to generate the key insert value. In embodiments where the first key composition rule also includes one or more additional mask operand values defining a mask and one or more mask offset values from a beginning position in the key insert value for applying the mask, the rule decoder may be configured to decode a user defined constant field extract command in the first key composition rule to extract the first constant value, the first repeat value, and the one or more additional mask operand values. In addition, the key generator may be configured for replicating the first constant value one or more times specified by the first repeat value to generate a first sequence string and applying the mask to the first sequence string at any position specified by the one or more mask offset values, thereby generating the key insert value. The frame processing engine may be configured to access a shared lookup table using the first lookup key to generate a frame classification for the first frame.

In yet other form, there is disclosed a frame processing device which includes a receive interface, key generation engine, and frame processing engine. As disclosed, the receive interface may be adapted to receive a frame. In addition, the key generation engine may be adapted to retrieve a first key composition rule which includes a variable length field extract command with a first operand defining a first constant value and a second operand defining a first repeat value. The key generation engine may also be adapted to generate a first lookup key by combining a key insert value with an n-tuple extracted from the frame, where the key insert value is generated by decoding the variable length field extract command to replicate the first constant value one or more times specified by the first repeat value. The frame processing engine may be configured or adapted to access a shared lookup table using the first lookup key to generate frame processing instructions for the frame. In selected embodiments, the first key composition rule also includes one or more additional mask operand values defining a mask and one or more mask offset values from a beginning position in the key insert value for applying the mask.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a communication processor with associated hardware devices for processing network frames without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of hardware or a computer system or a similar electronic computing device, that manipulates and transforms data represented as physical (electronic) quantities within registers and memories into other data similarly represented as physical quantities within the memories or registers or other such information storage, transmission or display devices.

Although the described exemplary embodiments disclosed herein are directed to various network data processing computer products, computing devices, and methodologies for processing network communications, the present invention is not necessarily limited to the example embodiments which illustrate inventive aspects of the present invention that are applicable to a wide variety of information processing systems and circuits. Thus, the particular embodiments disclosed above are illustrative only and should not be taken as limitations upon the present invention, as the invention may be modified and practiced in different but equivalent manners apparent to those skilled in the art having the benefit of the teachings herein. For example, although FIG. 1 and the discussion thereof describe an exemplary network frame classification architecture, this exemplary architecture is presented merely to provide a useful reference in discussing various aspects of the invention, and is not intended to be limiting so that persons of skill in the art will understand that the principles taught herein apply to other types of devices. For example, selected embodiments may implement the illustrated components of the data processing system 100 on a single integrated circuit or within a single device. Alternatively, data processing system 100 may include any number of separate integrated circuits or separate devices interconnected with each other. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for classifying received network frames, comprising:
   receiving a frame;
   retrieving from memory a first key composition rule comprising a first operand defining a first constant value, a second operand defining a first repeat value, and one or more mask operand values defining a mask and one or more mask offset values from a beginning position in a key insert value for applying the mask;
   generating a key insert value from the first key composition rule by:
      decoding a user defined constant field extract command in the first key composition rule to extract the first constant value, the first repeat value, and the one or more additional mask operand values,
      replicating the first constant value one or more times specified by the first repeat value to generate a first sequence string, and
      applying the mask to the first sequence string at any position specified by the one or more mask offset values, thereby generating the key insert value; and
   generating a lookup key by combining the key insert value with an n-tuple extracted from the frame.

2. The method of claim 1, where the key composition rule comprises a mask attribute which may be set to indicate application of one or more mask operands.

3. The method of claim 1, where generating the key insert value comprises:
   decoding a user defined constant field extract command in the first key composition rule to extract the first constant value and the first repeat value; and
   replicating the first constant value one or more times specified by the first repeat value to generate the key insert value.

4. The method of claim 1, where generating the lookup key comprises inserting the key insert value within the lookup key in place of one or more fields.

5. The method of claim 1, where generating the lookup key comprises inserting the key insert value as a prefix in front of the lookup key.

6. The method of claim 1, where generating the lookup key comprises inserting the key insert value as a suffix of the lookup key.

7. The method of claim 1, where generating the key insert value comprises inserting data based on field extract commands decoded from the first key composition rule using pipelined hardware logic.

8. The method of claim 1, further comprising looking up frame processing instructions from a shared lookup table using the lookup key to access a first subset of entries in the shared lookup table which match the key insert value.

9. The method of claim 1, where the first key composition rule comprises a user-defined constant field extract command and one or more additional field extract commands, where the user-defined constant field extract command is decoded to generate the key insert value and where the one or more additional field extract commands are decoded to generate the n-tuple for combination with the key insert value to generate the lookup key.

10. A system, comprising:
   a network interface configured to receive network communications and to output frames associated with the network communications; and
   a key generation engine comprising:
   a rule decoder for decoding a user defined constant field extract command in a first key composition rule to extract a first constant value, a first repeat value, and the one or more additional mask operand values; and
   a key generator for replicating the first constant value one or more times specified by the first repeat value to generate a first sequence string and applying the mask to the first sequence string at any position specified by the one or more mask offset values, thereby generating the key insert value,
   where the key generation engine is configured to receive a first frame from the network interface and to generate a first lookup key based on the first key composition rule comprising a variable length field extract command, a first operand defining the first constant value, a second operand defining the first repeat value, and one or more additional mask operand values defining a mask and one or more mask offset values from a beginning position in the key insert value for applying the mask, where the first key composition rule is decoded by the key generation engine to (1) generate a key insert value from the first and second operands by replicating the first constant value one or more times specified by the first repeat value, and (2) combine the key insert value with an n-tuple extracted from the first frame to generate the first lookup key.

11. The system of claim 10, where the first key composition rule comprises a user-defined constant field extract command and one or more additional field extract commands, where the user-defined constant field extract command is decoded to generate the key insert value and where the one or more additional field extract commands are decoded to generate an n-tuple for combination with the key insert value to generate the first lookup key.

12. The system of claim 10, where the key generation engine comprises:
   a rule decoder for decoding a user defined constant field extract command in the first key composition rule to extract the first constant value and the first repeat value; and
   a key generator for replicating the first constant value one or more times specified by the first repeat value to generate the key insert value.

13. The system of claim 10, where the key generation engine generates the first lookup key by inserting the key insert value as a prefix in front of the first lookup key.

14. The system of claim 10, where the key generation engine generates the first lookup key by inserting the key insert value as a suffix of the first lookup key.

15. A device comprising:
   a receive interface adapted to receive a frame; and
   a key generation engine adapted to retrieve a first key composition rule comprising a variable length field extract command with a first operand defining a first constant value, a second operand defining a first repeat value, and one or more mask operand values defining a mask and one or more mask offset values from a beginning position in a key insert value for applying the mask and to generate a first lookup key by combining a key insert value with an n-tuple extracted from the frame, where the key insert value is generated by:
      decoding a user defined constant field extract command in the first key composition rule to extract the first constant value, the first repeat value, and the one or more additional mask operand values,
      replicating the first constant value one or more times specified by the first repeat value to generate a first sequence string, and
      applying the mask to the first sequence string at any position specified by the one or more mask offset values, thereby generating the key insert.

16. The device of claim 15, where the first key composition rule further comprises one or more additional mask operand values defining a mask and one or more mask offset values from a beginning position in the key insert value for applying the mask.

* * * * *